United States Patent
Goffin

(10) Patent No.: US 7,634,565 B2
(45) Date of Patent: Dec. 15, 2009

(54) SYSTEM AUTHORIZING A REMOTE AGENT USING A TEMPORARY PASSWORD TO MANAGE CONFIGURATION SETTINGS OF A DEVICE AND INVALIDATING IT AFTER A FIXED TIME INTERVAL

(75) Inventor: Glen P Goffin, Dublin, PA (US)

(73) Assignee: General Instrument Corporation, Horsham, PA (US)

( * ) Notice: Subject to any disclaimer, the term of this patent is extended or adjusted under 35 U.S.C. 154(b) by 444 days.

(21) Appl. No.: 11/610,806

(22) Filed: Dec. 14, 2006

(65) Prior Publication Data

US 2008/0148372 A1 Jun. 19, 2008

(51) Int. Cl.
*G06F 15/173* (2006.01)
(52) U.S. Cl. .................. 709/225; 709/229
(58) Field of Classification Search .............. 709/220, 709/221, 225, 228, 229, 223; 713/200
See application file for complete search history.

(56) References Cited

U.S. PATENT DOCUMENTS

| | | | |
|---|---|---|---|
| 2002/0198975 A1* | 12/2002 | Bogia | 709/223 |
| 2003/0061323 A1* | 3/2003 | East et al. | 709/223 |
| 2003/0070084 A1* | 4/2003 | Satomaa et al. | 713/200 |
| 2004/0117489 A1* | 6/2004 | Harmon et al. | 709/229 |
| 2005/0188063 A1* | 8/2005 | Finley et al. | 709/221 |
| 2007/0226358 A1* | 9/2007 | Krywaniuk | 709/229 |
| 2008/0034091 A1* | 2/2008 | Gaya | 709/225 |
| 2008/0086553 A1* | 4/2008 | Theobald | 709/223 |
| 2008/0120419 A1* | 5/2008 | Yamartino et al. | 709/229 |

* cited by examiner

*Primary Examiner*—Le Luu

(57) ABSTRACT

A method and apparatus for the management of the configuration settings of an electronic device (108) by a remote agent is provided. The remote agent is connected to the electronic device via a network (100). The method includes temporarily authorizing (304) the remote agent to access administrative information and assume administrative control of the electronic device via the network. Further, the method includes modifying (306) the configuration settings of the electronic device in response to commands received from the remote agent. Moreover, the method includes terminating (308) the temporary access and control rights of the remote agent after the configuration settings of the electronic device are modified.

8 Claims, 4 Drawing Sheets

SYSTEM AUTHORIZING A REMOTE AGENT USING A TEMPORARY PASSWORD TO MANAGE CONFIGURATION SETTINGS OF A DEVICE AND INVALIDATING IT AFTER A FIXED TIME INTERVAL

The invention relates in general to the field of networks, and more particularly, to the management of the configuration settings of an electronic device in the network.

BACKGROUND OF THE INVENTION

Home networks are becoming increasingly popular today. Typically, a home network includes a centralized server unit and one or more electronic devices. A home network enables electronic devices to communicate with each other and other devices in an external network connected to the home network. Examples of such electronic devices include, but are not limited to, a mobile phone, a video phone, a smart phone, a laptop computer, a desktop computer, and a personal digital assistant (PDA). The electronic devices need to be connected and configured to the home network before they can communicate with each other. The connection and configuration is required to control the operation of the electronic devices via a centralized server. The devices can be easily connected to the home network, through wired or wireless communication links, by the user of the home network. However, currently, the process of configuring the electronic devices to the network has to be carried out by a service technician, who has to go to the location of the home network and configure the devices.

This procedure is tedious, since the service technician has to visit different locations whenever an electronic device needs to be configured.

BRIEF DESCRIPTION OF THE FIGURES

The accompanying figures, where like reference numerals refer to identical or functionally similar elements throughout the separate views, and which, together with the detailed description below, are incorporated in and form part of the specification, serve to further illustrate various embodiments and explain various principles and advantages, all in accordance with the present invention.

Figure 1:
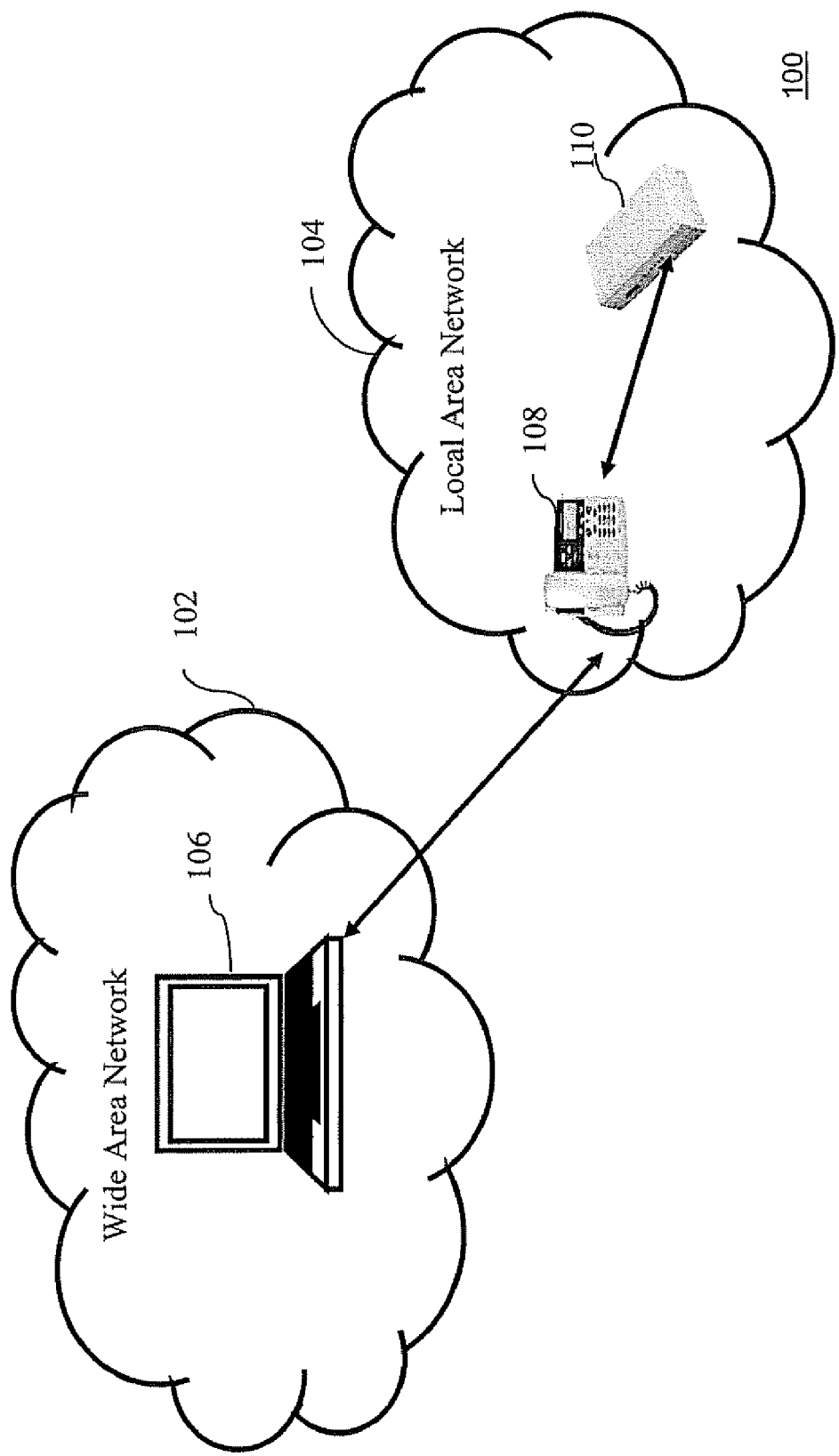
FIG. 1 illustrates an exemplary network, where various embodiments of the present invention can be practiced.

Skilled artisans will appreciate that the elements in the figures are illustrated for simplicity and clarity and have not necessarily been drawn to scale. For example, the dimensions of some of the elements in the figures may be exaggerated, relative to other elements, to help in improving an understanding of the embodiments of the present invention.

DETAILED DESCRIPTION

Before describing in detail the particular method and apparatus for managing the configuration settings of an electronic device, in accordance with various embodiments of the present invention, it should be observed that the present invention resides primarily in combinations of method steps and apparatus components related to the method and apparatus for managing the configuration settings of the electronic device. Accordingly, the apparatus components and method steps have been represented, where appropriate, by conventional symbols in the drawings, showing only those specific details that are pertinent for an understanding of the present invention, so as not to obscure the disclosure with details that will be readily apparent to those with ordinary skill in the art, having the benefit of the description herein.

In this document, relational terms such as first and second, and the like, may be used solely to distinguish one entity or action from another entity or action, without necessarily requiring or implying any actual relationship or order between such entities or actions. The terms "comprises," "comprising," or any other variation thereof, are intended to cover a non-exclusive inclusion, such that a process, method, article or apparatus that comprises a list of elements does not include only those elements but may include other elements that are not expressly listed or inherent in such a process, method, article or apparatus. An element proceeded by "comprises . . . a", does not, without more constraints, preclude the existence of additional identical elements in the process, method, article or apparatus that comprises the element. The term "another," as used in this document, is defined as at least a second or more. The terms "includes" and/or "having", as used herein, are defined as comprising.

In an embodiment, a method for managing the configuration settings of an electronic device by means of a remote agent is provided. The remote agent is connected to the electronic device via a network. The electronic device is connected in a local area network, for example, a home network, small office/home office or an enterprise network. The method includes temporarily authorizing the remote agent to access administrative information and assume administrative control of the electronic device via the network. Further, the method includes modifying the configuration settings of the electronic device, in response to commands received from the remote agent via the network. Moreover, the method includes terminating the temporary access and control rights of the remote agent after the configuration settings of the electronic device are modified.

In another embodiment, an electronic device that is connected to a network is provided. The electronic device includes an interface and a processor. The interface is responsive to commands that are received from a remote agent via the network. Further, the interface is configured to provide the remote agent with access to administrative information via the network. The processor is configured to enable the remote agent to assume temporary administrative control of the electronic device via the network, for the purpose of managing the configuration settings of the electronic device.

FIG. 1 illustrates an exemplary network 100, where various embodiments of the present invention can be practiced. The network 100 includes a plurality of communication devices that are connected to each other to share desired information. For the purpose of this description, the network 100 is shown to include a wide area network (WAN) 102 and a local area network (LAN) 104. An example of the LAN 104 includes, but is not limited to, a home network. However, it will be apparent to a person ordinarily skilled in the art that the network 100 can also include a metropolitan area network a campus area network, and the like. An example of the WAN 102 includes, but is not limited to, the Internet.

The WAN 102 includes a communication device 106. Examples of the communication device 106 include, but are not limited to, a laptop computer, a desktop computer, and a personal digital assistant (PDA). The communication device 106 is usually associated with a remote agent, which configures an electronic device 108 via the network 100. It will be apparent to a person ordinarily skilled in the art that the WAN 102 can include one or more communication devices apart from the communication device 106. Further, the one or more communication devices can communicate with each other through the WAN 102. Further, the LAN 104, as shown in FIG. 1, includes the electronic device 108 and a router 110. Examples of the electronic device 108 include, but are not limited to, a mobile phone, a video phone, a smart phone, a laptop computer, a desktop computer, and a personal digital assistant (PDA).

The electronic device 108, as shown in FIG. 1, requires modification of its configuration settings. Examples of these configuration settings may include firewall settings, antivirus settings, installation settings, and the like. The electronic device 108 is connected to a router 110. Although the electronic device 108 is shown to be connected with the router 110, however it will be apparent to a person ordinary skilled in the art that the electronic device 108 can be connected with any other network appliance such as a server. The router 110 contains administrative information about the electronic device 108. In an embodiment, the administrative information includes web-based pages. Examples of the web-based pages include hypertext mark-up language pages, extensible hypertext mark-up language pages, and the like. In an embodiment, the router 110 also contains administrative information pertaining to the LAN 104.

In an embodiment, a remote agent, for example, a Customer Service Representative (CSR) has Hyper Text Transfer Protocol (HTTP) proxy access to the LAN 104 via an electronic device. Further, the CSR is able to web-surf to the LAN 104 side of the router 110 and access the administrative control of web pages using the login supplied by user of the electronic device 108. The electronic device proxies or reflects the HTTP traffic on behalf of the router 110 from the LAN 104 to the WAN 102. The reason the electronic device needs to do this is because the Internet Protocol (IP) address assigned to a LAN port on the router 110 is not accessible from the WAN 102, as the LAN 104 is usually a private link-local IP address such as 192.168.20.1 that cannot be directly addressed from the WAN 102. The CSR can now directly access the electronic device, for example, Voice over IP (VoIP) phone using a public IP address and the electronic device can access the LAN port using the link-local IP address. The electronic device can then also act as an HTTP client to the router 110 and an HTTP server to the CSR's browser. In other words the CSR, from a remote location can surf administrative pages of the router 110 in order to reconfigure the router 110 on behalf of the user, however it is necessary to use an HTTP proxy server located in an electronic device that contains a publicly routable IP address like a VoIP phone.

Though the present invention is explained with the help of the network 100, it will be apparent to a person skilled in the art that the present invention can also be implemented in any other suitable environment or network.

Figure 2:
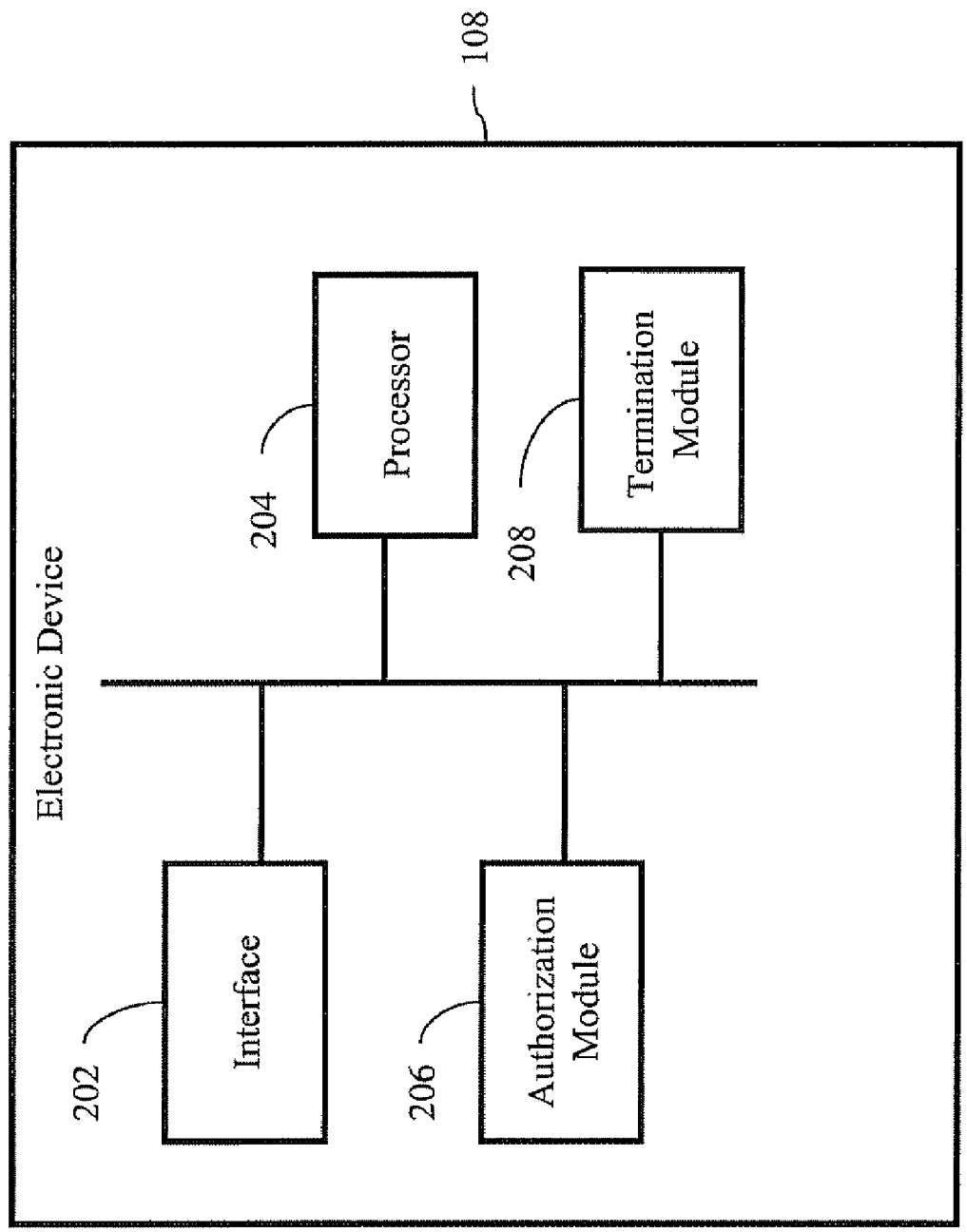
FIG. 2 illustrates a block diagram of an electronic device, in accordance with an embodiment of the present invention.

FIG. 2 illustrates a block diagram of the electronic device 108, in accordance with an embodiment of the present invention. Those skilled in the art will appreciate that the electronic device 108 may include all or even a fewer number of components than the components shown in FIG. 2. Further, those ordinarily skilled in the art will understand that the electronic device 108 may include additional components that are not shown here and are not germane to the operation of electronic device 108, in accordance with the inventive arrangements.

To describe the electronic device 108, reference will be made to FIG. 1, although it should be understood that the electronic device 108 can also be implemented in any other suitable environment or network.

The electronic device 108 is connected to the network 100. The electronic device 108 includes an interface 202 and a processor 204. The interface 202 is responsive to commands received from a remote agent via the WAN 102. The interface 202 is also configured to provide remote access to the administrative information, via the network 100, to the remote agent. In an embodiment, the remote agent is associated with the communication device 106. The request is sent by the remote agent to access the administrative information relating to the electronic device 108. The remote agent sends the request to manage the configuration settings of the electronic device 108. Managing the configuration settings includes, but is not limited to, configuring the electronic device 108 in the LAN 104 or modifying the configuration settings of the electronic device 108 according to the user's preferences. The interface 202 provides the administrative information pertaining to the electronic device 108, stored in the router 110, through the WAN 102. The interface 202 can be a software program, and the like.

The request received from the communication device 106 associated with the remote agent is transferred to the processor 204. The processor 204 is configured to enable the remote agent to assume temporary control of the electronic device 108 through the WAN 102. Temporary control is given to the communication device 106 associated with the remote agent, to manage the configuration settings of the electronic device 108. In an embodiment, the electronic device 108 also includes an authorization module 206, which is configured to authorize the remote agent. The remote agent is authorized prior to it being granted access to the interface 202 and control of the configuration settings. In an embodiment, access is granted by the authorization module 206, based on a password provided by the remote agent.

In an embodiment, the electronic device 108 also includes a termination module 208. The termination module 208 is configured to terminate the temporary control of the temporary access and the control rights of the remote agent after the configuration settings of the electronic device 108 are modified.

It should be understood that the authorization module 206 and termination module 208 can be implemented as one or more physical devices that are coupled to the processor 204 through a communication channel. Alternatively, authorization module 206 and termination module 208 can be represented by one or more software applications (or even a combination of software and hardware, e.g., using application specific integrated circuits (ASIC)), where the software is loaded from a storage medium, (e.g., a magnetic or optical drive or diskette) and operated by the processor 204 in memory (not shown) of electronic device 108. As such, the authorization module 206 and termination module 208 (including associated data structures) of the present invention can be stored on a computer readable medium, e.g., RAM memory, magnetic or optical drive or diskette and the like.

Figure 3:
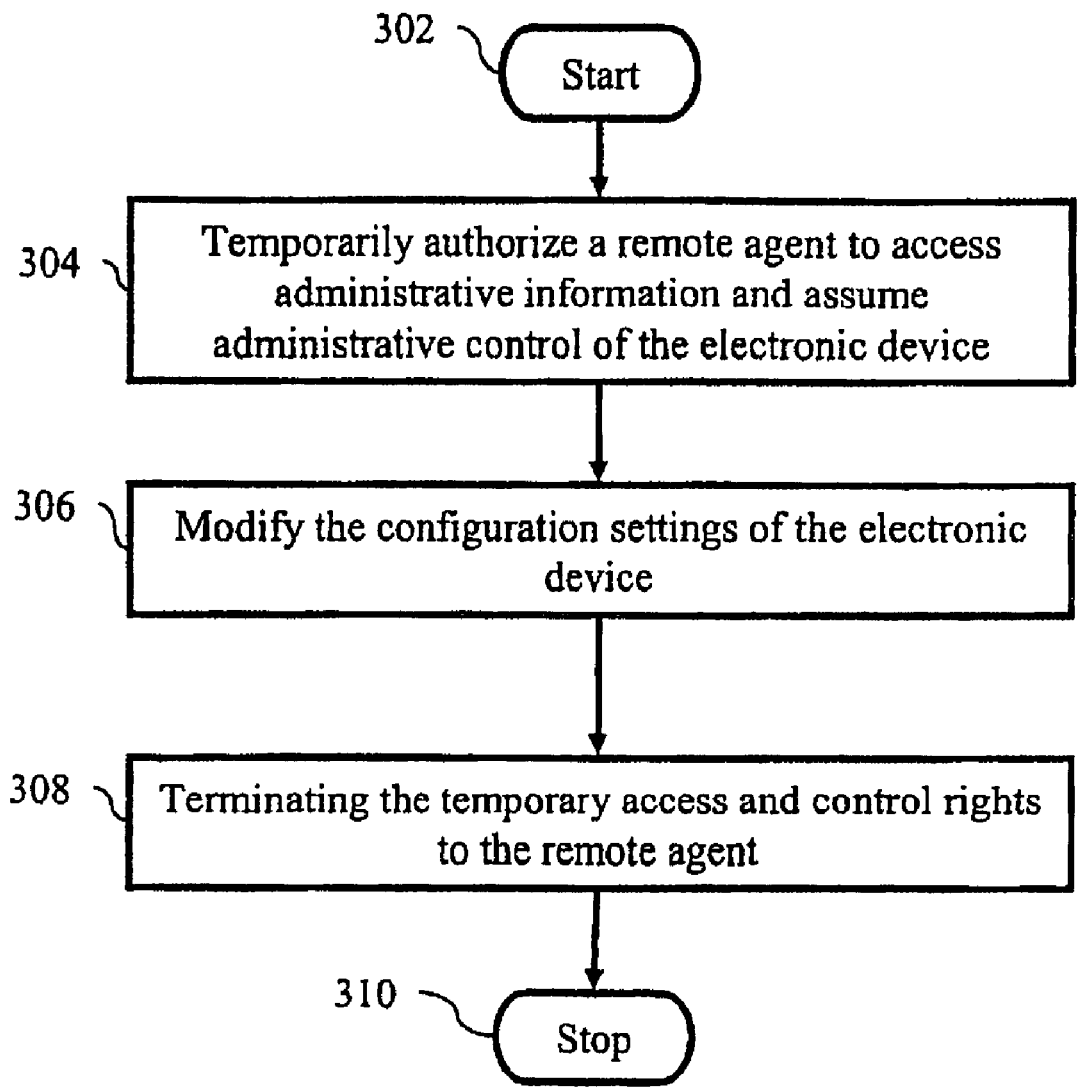
FIG. 3 is a flow diagram illustrating a method for managing the configuration setting of an electronic device, in accordance with an embodiment of the present invention.

FIG. 3 is a flow diagram illustrating a method for managing the configuration setting of the electronic device 108, in accordance with an embodiment of the present invention. To describe the method, reference will be made to FIGS. 1 and 2, although it is understood that the method can be implemented in any other suitable embodiment of the present invention. Moreover, the invention is not limited to the order in which the steps are listed in the method.

The method for managing the configuration setting of an electronic device initiates at step 302. At step 304, the remote agent is temporarily authorized to access the administrative information and assume control of the electronic device 108 via the network 100. In an embodiment, the remote agent sends a request to the electronic device 108, to access the administrative information and assume temporary control of the electronic device 108 via the WAN 102. For example, the interface 202 of the electronic device 108 responds to the request by providing access to its administrative information. Further, the interface 202 of the electronic device 108 provides access to and temporary control of the electronic device 108 by receiving commands from the processor 204 and the authorization module 206.

At step 306, the remote agent modifies the configuration settings of the electronic device 108 by using the administrative information. This modification is carried out in response to commands received from the remote agent via the network 100. The modification of the configuration settings can be carried out according to the user preferences of the electronic device 108. At step 308, access to the administrative information and temporary control of the electronic device 108 to the remote agent is terminated. For example, the termination module 208 terminates the remote agent's temporary control of and access to the administrative information. Thereafter, the method for managing the configuration setting of the electronic device 108 terminates at step 310.

Figure 4:
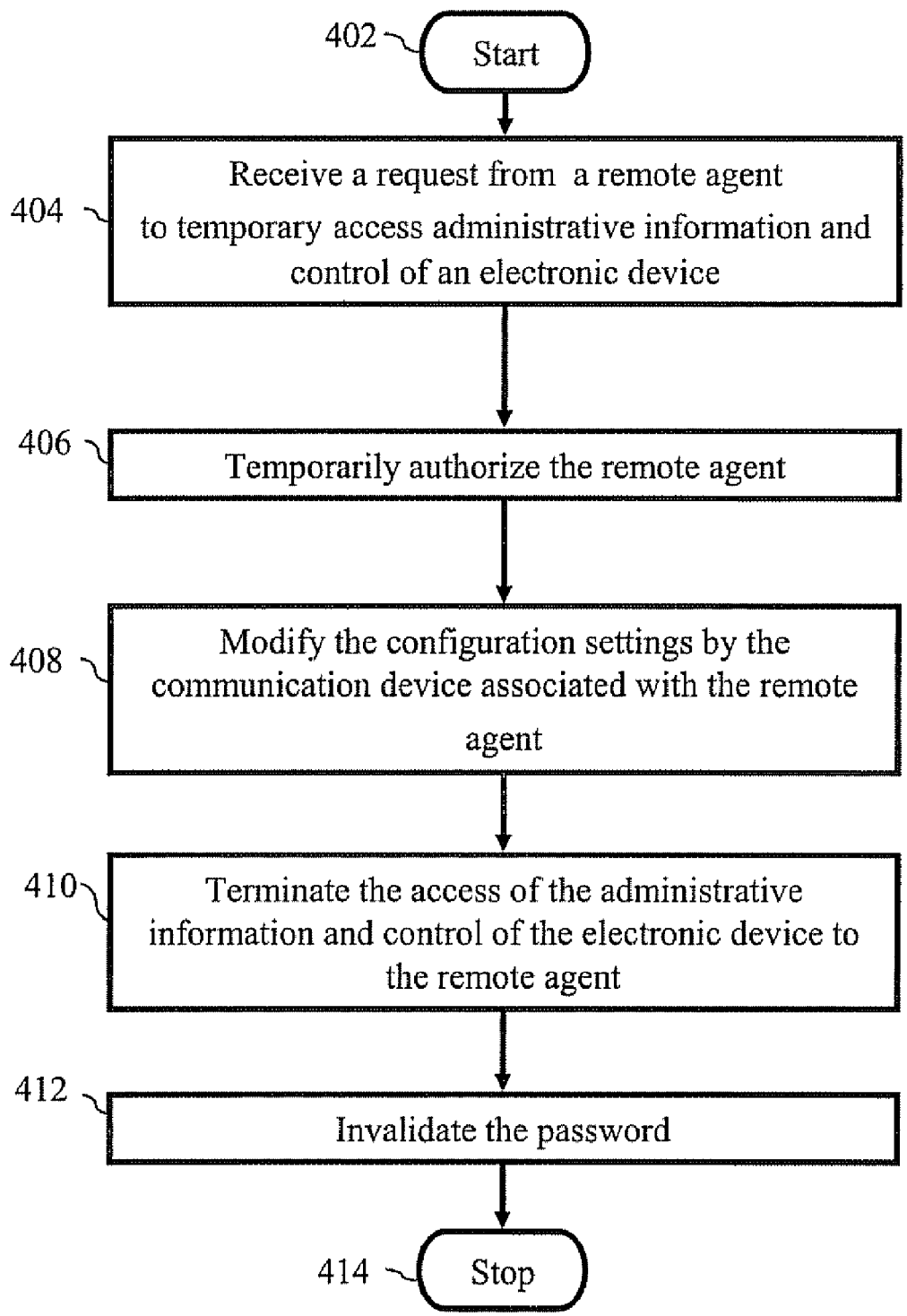
FIG. 4 is a flow diagram illustrating a method for managing the configuration settings of an electronic device, in accordance with another embodiment of the present invention.

FIG. 4 is a flow diagram illustrating a method for managing the configuration setting of the electronic device 108, in accordance with another embodiment of the present invention. To describe the method, reference will be made to FIGS. 1 and 2, although it is understood that the method can be implemented in any other suitable embodiment of the present invention. Further, the method can be implemented by using a fewer or greater number of steps, as shown in FIG. 4. Moreover, the invention is not limited to the order in which the steps are listed in the method.

The method for managing the configuration setting of the electronic device 108 initiates at step 402. At step 404, the electronic device 108 receives a request to access the administrative information and assume temporary control of the electronic device 108. The electronic device 108 is connected a LAN, for example, the LAN 104. An example of the LAN 104 includes, but is not limited to, a home network. The request is received from the remote agent. In an embodiment, the electronic device 108, after receiving the request, accesses administrative information pertaining to it from the router 110 via the LAN 104. In this embodiment, the electronic device 108 seeks permission from the router 110 to access administrative information pertaining to the electronic device 108. At step 406, the remote agent is temporarily authorized to access the administrative information and assume administrative control of the electronic device 108 via the network 100. In an embodiment, the administrative information includes web-based pages. In another embodiment, the network 100 is a WAN. Examples of the WAN include the Internet, and the like. The remote agent is granted authorization, based on a password provided to the electronic device 108.

In an embodiment, the remote agent provides the password to the electronic device 108 via the interface 202. For example, the interface 202 receives the request and sends it to the processor 204. The processor 204 enables the request, and provides temporary control of and access to the administrative information of the electronic device 108, via the interface 202, to the communication device 106. The processor 204 enables the request only after authorization is provided by the authorization module 206. The authorization module 206 only provides authorization when the user associated with the electronic device 108 feeds in a password. Examples of the password can be a personal identification number, a digital password, bio-metric information, and the like. At step 408, the remote agent modifies the configuration settings of the electronic device 108 by using the administrative information. The configuration settings of the electronic device 108 are modified in response to commands received from the remote agent via the network 100. In one embodiment, the communication device 106 associated with the remote agent sends a notification relating to the modification of the configuration settings to the electronic device 108. At step 410, the electronic device 108 terminates the temporary control of and access to the communication device 106 associated with the remote agent.

For example, after the completion of the modification of the electronic device 108, the termination module 208 terminates the temporary control of and access to the administrative information pertaining to the communication device 106 associated with the remote agent. At step 412, the password is invalidated. In an embodiment, the password is invalidated after a fixed interval. In another embodiment, the user associated with the electronic device 108 updates the password, to prevent undesired operation of the electronic device 108. At step 414, the method for managing the configuration setting of the electronic device 108 terminates.

The method is illustrated with reference to an example, for clarity. For instance, an Internet Protocol (IP) phone that is plugged into a home network or a LAN needs modification in its configuration settings. A remote agent associated with a communication device in a WAN seeks the permission of the user associated with the IP phone, to access the hypertext mark-up language (HTML) pages of the IP phone. This is to assume temporary administrative control of and access to administrative information pertaining to the IP phone, via the WAN. The user of the IP phone enters a password so that the remote agent can be granted the required authorization. The associated remote agent can modify the configuration settings through the WAN, on receiving the authorization. Once the process of modifying the configuration settings is over, access is terminated to the remote agent. Further, the user of the IP phone can update the password.

Various embodiments, as described above, provide a method and apparatus for managing the configuration settings of an electronic device. In this method, a remote agent, for example, a customer service representative, can remotely modify the configuration settings of the electronic device by accessing the administrative information pertaining to the electronic device. Moreover, this information is completely secure, since the customer service representative has to first seek the permission of the user associated with the electronic device, to access the administrative information.

It should be appreciated that the method and apparatus for managing the configuration settings of the electronic device, described herein, may include one or more conventional processors and unique stored program instructions that control the one or more processors, to implement, in conjunction with certain non-processor circuits, some, most, or all of the functions of the system described herein. The non-processor circuits may include, but are not limited to, signal drivers, clock circuits, power-source circuits, and user-input devices. As such, these functions may be interpreted as steps of a method to enable a remote agent to manage configuration settings of an electronic device. Alternatively, some or all the functions could be implemented by a state machine that has no stored program instructions, or in one or more application-specific integrated circuits (ASICs), in which each function, or some combinations of certain of the functions, are implemented as custom logic. Of course, a combination of the two approaches could also be used. Thus, methods and means for these functions have been described herein.

It is expected that one with ordinary skill, notwithstanding possibly significant effort and many design choices, motivated by, for example, available time, current technology and economic considerations, when guided by the concepts and principles disclosed herein, will be readily capable of generating such software instructions, programs and ICs with minimal experimentation.

In the foregoing specification, the invention and its benefits and advantages have been described with reference to specific embodiments. However, one with ordinary skill in the art would appreciate that various modifications and changes can be made without departing from the scope of the present invention, as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage or solution to occur or become more pronounced are not to be construed as critical, required or essential features or elements of any or all the claims. The invention is defined solely by the appended claims, including any amendments made during the pendency of this application, and all equivalents of those claims, as issued.

What is claimed is:

1. A method for managing configuration settings of an electronic device on a network by a remote agent, the method comprising the steps of:
   temporarily authorizing the remote agent to access administrative information and assume administrative control of the electronic device, the temporary authorization is gained based upon a password provided to the remote agent by the electronic device, and wherein the password is invalidated after a fixed time interval;
   modifying the configuration settings of the electronic device in response to commands received from the remote agent, and
   terminating the temporary access and control rights of the remote agent after either one of the configuration settings of the electronic device being modified and the password being invalidated.

2. The method as recited in claim 1, wherein the electronic device is connected to a home local area network and wherein the remote agent is connected to a wide area network, the remote agent having internet proxy access to the local area network via the electronic device, wherein the electronic device reflects the internet traffic from the local area network to the wide area network, such that the remote agent can directly access the electronic device using a public Internet protocol address and the electronic device can access the local area network using the link-local Internet protocol address.

3. The method as recited in claim 2, wherein the electronic device can act as an Hyper Text Transfer Protocol client to a router and a Hyper Text Transfer Protocol proxy server containing a publicly routable Internet protocol address to an Internet browser of the remote agent.

4. The method as recited in claim 1, wherein the administrative information comprises web-based pages.

5. The method as recited in claim 1, wherein the password is selected from the group comprising a personal identification number, a bio-metric information and a digital password.

6. An electronic device comprising:
   an interface, responsive to commands from a remote agent received, and configured to provide the remote agent with access to administrative information;
   an authorization module configured to authorize the remote agent, prior to the agent being granted access to the interface, to control of the configuration settings of the electronic device, the access is provided through a temporary authorization that is gained based upon a password provided to the remote agent by the electronic device;
   a processor configured to enable the remote agent to assume temporary administrative control of the electronic device for the purpose of managing configuration settings of the electronic device; and
   a termination module configured to terminate the temporary access and control rights of the remote agent upon either one of the configuration settings of the electronic device being modified and the password being invalidated.

7. The electronic device as recited in claim 6, wherein the electronic device is connected to a home local area network and wherein the remote agent is connected to a wide area network, the remote agent having internet proxy access to the local area network via the electronic device, wherein the electronic device reflects the internet traffic from the local area network to the wide area network, such that the remote agent can directly access the electronic device using a public Internet protocol address and the electronic device can access the local area network using the link-local Internet protocol address.

8. The electronic device as recited in claim 7, wherein the electronic device can act as an Hyper Text Transfer Protocol client to a router and a Hyper Text Transfer Protocol proxy server containing a publicly routable Internet protocol address to an Internet browser of the remote agent.

* * * * *